UNITED STATES PATENT OFFICE.

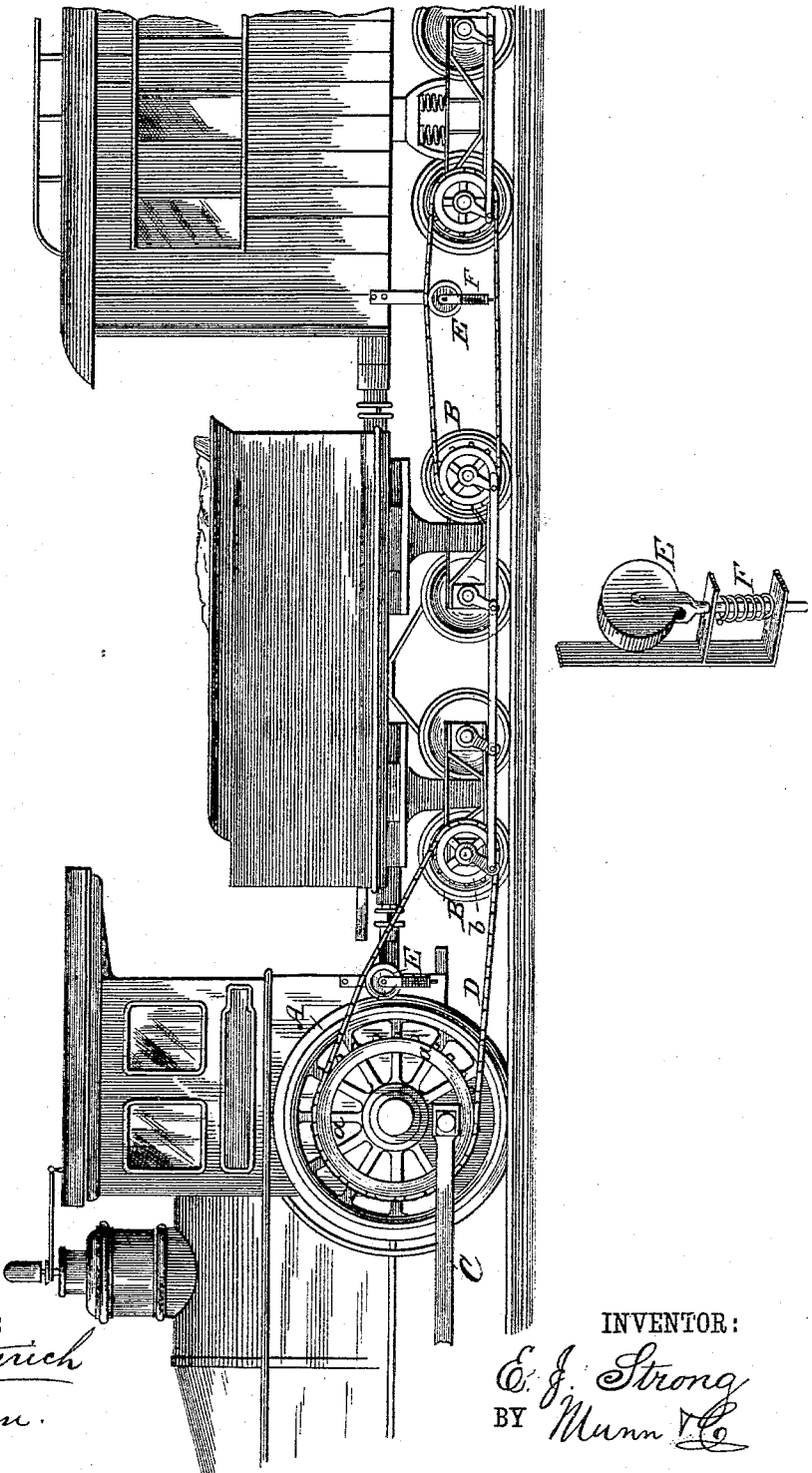

EDWIN J. STRONG, OF LAINGSBURG, MICHIGAN.

MOTOR ATTACHMENT FOR LOCOMOTIVES.

SPECIFICATION forming part of Letters Patent No. 339,596, dated April 6, 1886.

Application filed January 5, 1886. Serial No. 187,749. (No model.)

*To all whom it may concern:*

Be it known that I, EDWIN J. STRONG, of Laingsburg, in the county of Shiawassee and State of Michigan, have invented a new and useful Improvement in Motor Attachments, of which the following is a description.

This invention relates to that class of motor attachments for locomotives which has for an object to provide simple means for preventing the drive-wheels of a locomotive from turning upon the track without moving forward, in order to prevent slipping of such wheels, the object being to thereby increase the tractile power of the locomotive.

The invention consists in gearing said drive-wheels with the wheel or wheels of one or more cars in train with the locomotive, and in other improvements, as will be hereinafter explained.

In the drawing I have represented my invention applied to the drive-wheels on one side of a locomotive and two of the wheels on one side of a following car, usually the tender, as shown. The construction, it will be understood, is duplicated on the opposite side.

In carrying out my invention I preferably provide the drive-wheels A of a locomotive with side pulleys, *a*. These pulleys may be formed integral with the drive-wheels or separate from and bolted to such wheels, as desired. The wheels B of a following car or cars may be likewise provided with pulleys *b*. A pitman, C, connects the drive-wheels, and a belt, D, connects the rear drive-wheels of the locomotive with the forward wheel of the adjacent car, which is in the present instance the tender. It is preferred to employ a sprocket-belt, and to form the pulleys to correspond therewith, as this form of gearing is found best for the purpose. The wheels of the rear cars, of which only one is shown, may be geared together and with the car in front and rear.

It will be understood that the wheels on one side of a car might all be connected by a pitman-link in similar manner to the locomotive-wheels. By thus gearing the drive-wheels with the wheels of an adjacent car or cars the former are prevented from turning or slipping on the track without moving forward or back, and the locomotive is able to draw heavier loads than would otherwise be possible.

For convenience of reference, I will include the locomotive, tender, and cars in the general term "vehicles." All of the belts may be slack; but it is found especially desirable that those connecting the wheels of two adjacent vehicles be slack, because of the distance between such vehicles varying during the progress of the train. To permit the use of such slack belt and at the same time hold such belt to properly turn the wheels, I find it desirable to employ a pressure-pulley, E, arranged to bear on the belt and hold it taut. This pulley is yielding, to which end it is usually supported on a spring or elastic arm, F, secured to one or the other of the adjacent vehicles. By this construction the belt is held taut to properly operate without reference to variance in distance between the said vehicles.

Manifestly the number of cars in train may vary, and all or only a fraction thereof may be geared with the engine drive wheel or wheels, as may prove desirable or necessary.

Manifestly it would involve no departure from the principles of my invention to secure the pulleys on the axles of the wheels laterally to such wheels.

Having thus described my invention, what I claim as new is—

The combination of a train of wheeled vehicles connected together, substantially as described, whereby they may have a limited movement toward and from each other, independent belts connecting the end wheels of one vehicle with those of the adjacent one, such belts being slack, whereby the vehicles may round curves, and yielding pulleys arranged to bear on said belts between the connected wheels of the vehicles, substantially as and for the purposes specified.

EDWIN J. STRONG.

Witnesses:
DANIEL LEBAR,
WM. H. CLARK.